(12) United States Patent
Dorneich et al.

(10) Patent No.: US 7,515,069 B2
(45) Date of Patent: Apr. 7, 2009

(54) MULTIFUNCTIONAL AVIONIC DISPLAY

(75) Inventors: Michael C. Dorneich, St. Paul, MN (US); Stephen G. McCauley, Peoria, AZ (US); Jeffrey M. Rye, Roseville, MN (US); Patricia M. Ververs, Ellicott City, MD (US)

(73) Assignee: Honeywell International, Inc., Morristown, NJ (US)

( * ) Notice: Subject to any disclaimer, the term of this patent is extended or adjusted under 35 U.S.C. 154(b) by 649 days.

(21) Appl. No.: 11/115,507

(22) Filed: Apr. 27, 2005

(65) Prior Publication Data

US 2006/0244655 A1  Nov. 2, 2006

(51) Int. Cl.
*G08B 21/00* (2006.01)
(52) U.S. Cl. .................... 340/945; 340/970; 340/995.1; 340/995.17; 342/179; 342/182
(58) Field of Classification Search ................ 340/970, 340/961, 968, 945, 949, 963, 946, 995.1, 340/995.13, 995.17; 701/309, 9, 3, 10, 14; 342/65, 64, 26 R, 179, 182, 183; 715/794, 715/790, 803; 345/345, 343, 113, 340, 339
See application file for complete search history.

(56) References Cited

U.S. PATENT DOCUMENTS

| | | | | |
|---|---|---|---|---|
| 4,364,085 A * | 12/1982 | Dalke | ........................... | 348/32 |
| 5,379,215 A * | 1/1995 | Kruhoeffer et al. | ............. | 702/3 |
| 5,805,163 A * | 9/1998 | Bagnas | ........................ | 715/768 |
| 5,892,511 A * | 4/1999 | Gelsinger et al. | ............ | 715/794 |
| 6,401,038 B2 * | 6/2002 | Gia | .............................. | 701/301 |
| 6,445,400 B1 | 9/2002 | Maddalozzo, Jr. et al. | | |
| 6,653,947 B2 * | 11/2003 | Dwyer et al. | ................ | 340/970 |
| 6,865,452 B2 * | 3/2005 | Burdon | ........................... | 701/3 |
| 7,161,525 B1 * | 1/2007 | Finley et al. | ............... | 342/26 R |
| 2004/0231217 A1 | 11/2004 | Kock et al. | | |
| 2004/0258222 A1 | 12/2004 | Kobrosly et al. | | |

* cited by examiner

*Primary Examiner*—Anh V La
(74) *Attorney, Agent, or Firm*—Ingrassia Fisher & Lorenz, P.C.

(57) ABSTRACT

A display screen for displaying multiple sets of information is provided. The display screen includes at least one region of a select color designated to convey a first set of information and a plurality of adjustable areas designated to convey a second set of information. The plurality of adjustable areas overlay at least a portion of the at least one region of select color of the first set of information. Moreover, each adjustable area is defined by an outline and a color encased in the outline.

34 Claims, 2 Drawing Sheets

MULTIFUNCTIONAL AVIONIC DISPLAY

TECHNICAL FIELD

The present invention relates generally to the display of information and in particular to the display of two or more sets of information on a display screen simultaneously.

BACKGROUND

Current avionic displays are typically designed to display different sets of information either on separate displays or only one set of information at a time. This is required because the displays typically display different information in a similar way. For example, typically area fill is used to denote location and spatial extent of phenomena, such as terrain information and weather information. However, it is common for terrain and weather information to be displayed using similar color palettes. For example, both terrain and weather radar may be displayed using the same colors green, yellow and red to represent increasing degrees of threat, safety criticality, or need for flight crew awareness or response. The green color is typically designated as indicating the lowest precipitation rate or least critical of the terrain that currently threatens the aircraft given the current position. Red is typically designed as indicating either the most severe weather or the heaviest precipitation on weather radar or the most critical terrain relating to the position of the aircraft. Moreover, the yellow color is typically designated as indicating weather that has a severity level somewhere between the severity level designated by the red and green colors and a terrain that is in between the terrain indicated by the red and green colors in relation to the position of the plane.

To avoid confusion in displaying weather and terrain information, separate displays are used or the information is toggled between screens of the same display. However, there are limitations to this implementation. For example, with separate screens, the pilot must be able to integrate the weather and terrain information mentally in order to avoid conflicts. This takes time and can be confusing especially when the screen may provide the information in different size grids (scale) or orientation. Moreover, in critical situations, the use of different screens or toggling between screens is detrimental in conveying the needed information in a fast an effective manner.

For the reasons stated above and for other reasons stated below which will become apparent to those skilled in the art upon reading and understanding the present specification, there is a need in the art for a method of conveying different information simultaneously in an efficient and effective manner on a single display screen.

SUMMARY OF THE INVENTION

The above-mentioned problems of current systems are addressed by embodiments of the present invention and will be understood by reading and studying the following specification.

In one embodiment, a display screen for displaying multiple sets of information is provided. The display screen includes at least one region of a select color designated to convey a first set of information and a plurality of adjustable areas designated to convey a second set of information. The plurality of adjustable areas overlay at least a portion of the at least one region of select color of the first set of information. Moreover, each adjustable area is defined by an outline and a color encased in the outline.

In another embodiment, an aviation display screen is provided. The display screen includes an area location fill, terrain region alerts and a plurality of adjustably patterned weather areas. The area location fill is adapted to indicate non-threatening terrain at a location. The terrain region alerts are adapted to indicate threatening terrain. The plurality of adjustably patterned weather areas overlay at least a portion of the area location fill and the terrain region alerts. Moreover, each patterned weather area has a visibly distinct defining border or outline. The size of each adjustable patterned area is adjustable to allow a desired visibility level of the area location fill and the terrain region alerts.

In still another embodiment, a method of displaying different sets of information on the same display screen at the same time is provided. The method comprises, displaying a first set of information with at least one color region that covers a portion of a display and displaying a second set of information with a plurality of adjustably sized areas of select colors. Each adjustably sized area is defined by a visually distinct border such that second set of information is easily discernable from the first set of information when they both occupy the same region of the display even if the first set of information and the second set of information are conveyed with the use of the same color palettes.

In still further another embodiment, a method of displaying terrain and weather information on the same display screen simultaneously is provided. The method includes displaying one or more terrain region alerts with one or more colors. Each color represents a level of hazard with an associated terrain. Overlaying the one or more terrain region alerts with a plurality of adjustable patterned weather areas. Each weather area has a color indicative of the intensity of the weather it is associated with and a visibly distinct border.

In yet another embodiment, a computer-readable medium having computer-executable instructions for performing a method is provided. The method includes displaying one or more terrain region alerts over a given location with one or more regions of colors on a display screen, wherein different colors indicate different levels of concern of the terrain regions. Displaying a plurality of patterned weather areas overlaying at least a portion of the terrain region alerts, wherein each patterned weather area includes a color indicative of the intensity of the weather at a location it represents and a border that is visibly distinct.

In finally another embodiment, a display to display multiple sets of information simultaneously is provided. The display includes a means for displaying a first set of information in regions of select colors, a means for displaying a second set of data in the form of a plurality of patterned areas of select colors overlaying at least a portion of the first set of information and a means for adjusting the size of the plurality of pattered areas to provide a desired viewable amount of the first set of information. Each color of the regions of select colors represents a category of the first set of information. Each patterned area is defined by a visibly distinct outline and each color of the patterned area represents a category of the second set of information.

BRIEF DESCRIPTION OF THE DRAWINGS

The present invention can be more easily understood and further advantages and uses thereof more readily apparent, when considered in view of the description of the preferred embodiments and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention provide a display that effectively conveys different sets of information even if the sets of information are provided by colors having similar color palettes. In particular, in one embodiment, an avionic display screen displaying terrain and weather simultaneously is provided. Further in one embodiment, weather is displayed using a plurality of adjustable areas that overlay the terrain information. Each adjustable weather area is defined by a visibly distinct border.

Figure 1:
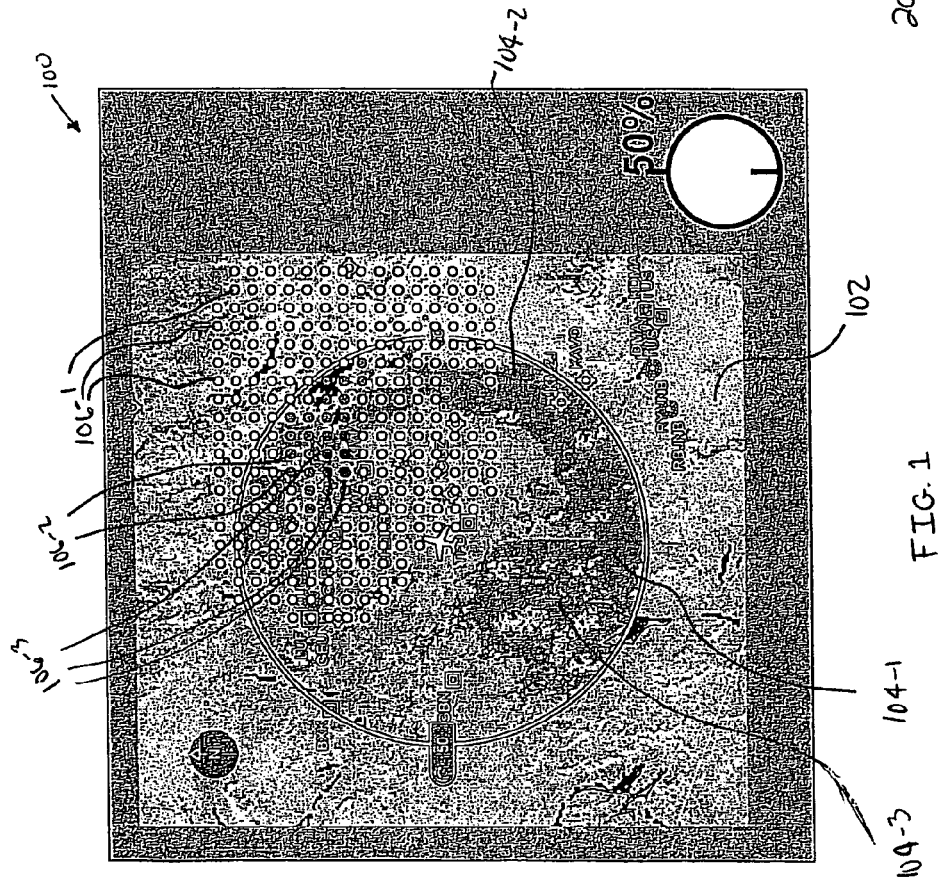
FIG. 1 is a display screen of one embodiment of the present invention.

Referring to FIG. 1, a display screen 100 of one embodiment of the present invention is illustrated. As illustrated, the display screen 100 includes area location fill 102, terrain region alerts which are generally designated as 104, and a plurality of weather areas which are generally designated as 106. The area location fill 102 is used to convey the general non-threatening terrain over an area in which the aircraft is traveling. The area location fill is typically illustrated with the used of neutral colors or no color at all. The area location fill 102 can also be referred to as situation awareness terrain 102. The terrain region alerts 104 are used to convey terrain having a more threatening level of alert than the area location fill. The terrain region alerts 104 may be categorized by the levels of alert. For example, the terrain regions of different levels of concern or hazard may be differentiated from each other by different color palettes. For example, in one embodiment, terrain region alert 104-1 has the highest level of hazard and is displayed in red, terrain region alert 104-2 has a lower hazard level and is displayed in yellow and terrain region alert 104-3 has yet still a lower hazard level and is displayed in green. It will be understood that other colors and other levels of alert can be used and the present invention is not limited to the colors and levels of alerts provided in the example above.

As further illustrated in FIG. 1, the plurality of weather areas 106 are overlaid on the terrain region alerts 104 and the area location fill 102. Each weather area 106 is defined by a visibly distinct outline or border. In the embodiment of FIG. 1, the weather areas 106 are illustrated as a plurality of circles or dots. However, in other embodiments the weather areas 106 are patterned in different shapes such as triangle, squares, etc. and the invention is not limited to just circles. In one embodiment the outline (or halo) of each weather area is black. In other embodiments, other visibly distinct colors are used for the borders or outlines. As with the terrain region alerts 104-1 through 104-3, the weather areas are adapted to convey levels of hazard. This is done by selectively coloring each weather area 106. For example, referring to FIG. 1, the weather areas 106-1 are designated as being green which indicates a low level of hazard. Weather areas 106-2 are designated as being yellow which indicates a medium level of hazard and weather areas 106-3 are designated as being red which indicates a high level of hazard.

Figure 2:
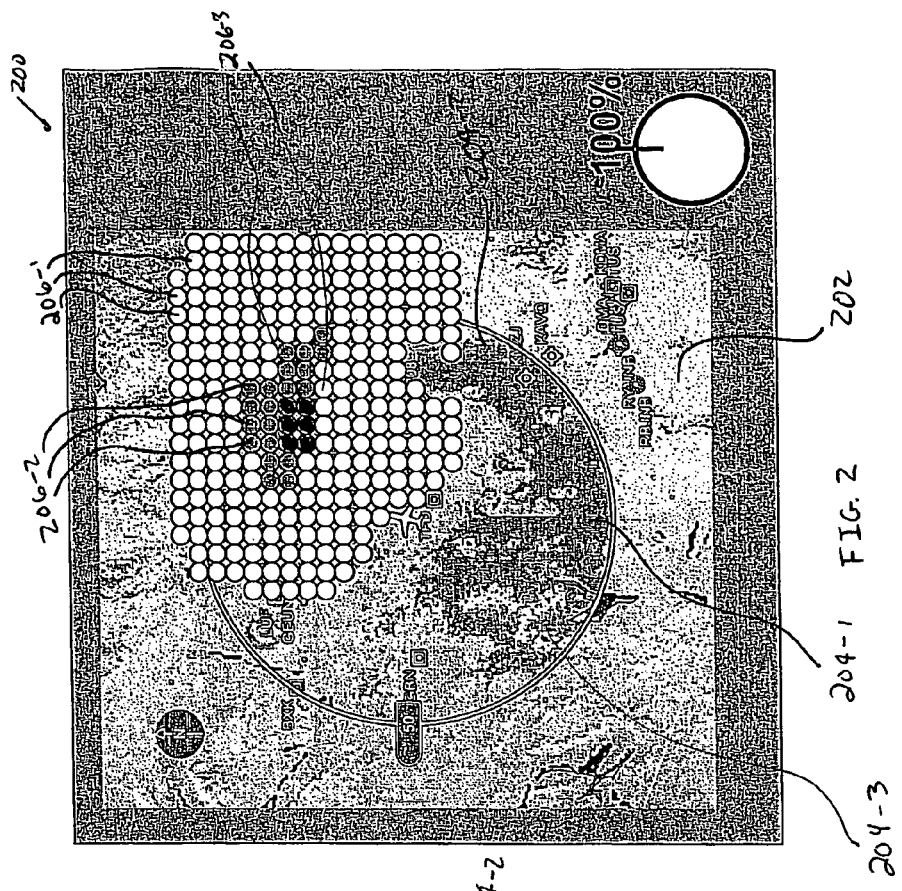
FIG. 2 is a display screen of another embodiment of the present invention.

In embodiments of the present invention, the size of each weather area is adjustable. In particular, the plurality of weather areas 106 can be adjusted in size to show more or less of the underlying terrain region alerts 104 and area location fill 102. Referring to FIG. 2, an example of another display screen 200 of one embodiment of the present invention is illustrated. In this example, the weather areas 206 have been increased in size to virtually block the view to the underline terrain region alerts 204 and the area location fill 202 where the weather is of concern with relation to the location displayed in the screen display 200. This is useful when the weather is of a major concern. In another embodiment, the space between weather areas 206 are adjusted to show more or less of the terrain region alerts 204 and the area location fill 202. Similar to the display screen of FIG. 1, the weather areas 106 include weather areas 106-1, 106-2 and 106-3 each of which are colored to indicate the level of intensity of the weather in the particular location. Moreover, terrain region alerts 204-1, 204-2 and 204-3 are similarly colored to indicate the level of hazard in a particular location displayed on the display screen 200. Although, the weather areas and the terrain regions are illustrated as only having three different colors associated with three different levels of hazard or intensity in FIGS. 1 and 2, it will be understood in the art that more or less levels of hazard or intensities can be used and that this invention is not limited to just three.

In one embodiment of the present invention, when a terrain of a high concern is detected, the display screen 200 will automatically reduce the size of the weather areas 206 to draw attention of the pilot to the hazard. Likewise, in one embodiment, when a significant weather hazard is detected, the weather areas are increased in density to draw attention of the pilot to the hazard. In other embodiments, other methods of drawing attention of the pilots when either terrain or weather is detected that is of a concern are used such as emitting a tone or flashing on and off associated terrain regions or weather areas. In another embodiment, the changing of size of weather areas 206 occurs in a staggered fashion based on weather severity. For example, in this embodiment weather areas such as weather areas 206-1 are changed in size at a slightly different time than weather areas 206-2. This staggering in time in changing the weather areas sizes helps pilots quickly differentiate area weather with differing severities. Still further in another embodiment, the density of the plurality weather areas 206 is adjusted based on the intensity of weather it represents on the area location fill.

Figure 3:
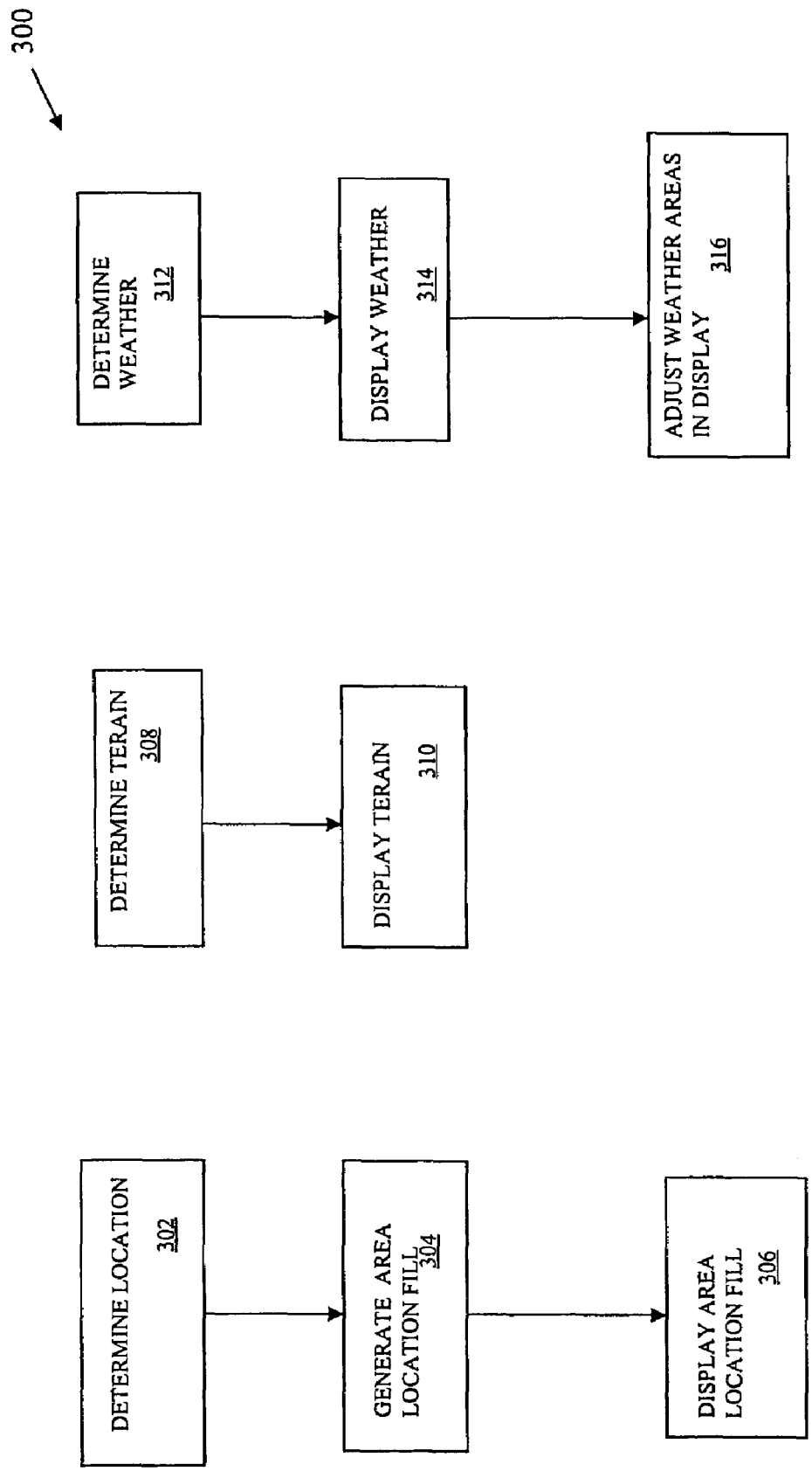
FIG. 3, is a flow diagram of one embodiment of the present invention.

FIG. 3 illustrated a flow diagram 300 of one embodiment of the present invention. As illustrated, the location in which the aircraft is flying is determined (302). An area location fill is then generated based on the determined location of the aircraft (304). The area location fill provides an illustration of non-threatening terrain over a location of the aircraft on the display screen (306). This can also be referred to as situational awareness terrain. In one embodiment, the situational terrain awareness terrain is obtained by comparing the aircraft position to a terrain database. The terrain region alerts are also determined (308). This is the more threatening terrain associated with hazard alerts. In one embodiment this is generated from an Enhanced Ground Proximity Warning System (EG- PWS). The terrain region alerts are then displayed on the display screen (310). As with other embodiments of the present invention, the terrain region alerts are displayed in regions of colors wherein each color has a meaning. The weather is further determined (312). In one embodiment this is done by a radar system. In another embodiment, this is done with a weather data uplink to the flight deck. The weather is then displayed on the display screen (314). As with other embodiments, the weather is displayed with a plurality of patterned weather areas that overlay the terrain region alerts and the area location fill. Moreover, the intensity of the weather in relation to a weather area is indicated by a distinct color. In addition a border or outline defines each of the weather areas to provide a contrast from other information displayed on the display screen. The weather areas can then be adjusted to reveal more or less of the underlying terrain region alerts and area location fill information (316). In one embodiment, the weather areas resemble dots that can change in diameter via pilot control. In one embodiment, the weather area can be shrunk down in size so that only the borders of the weather areas are visible. This embodiment is helpful to pilots because it effectively conveys the size of a weather area of concern while not blocking the view of terrain region alerts with the colors of the weather areas. Moreover, in one embodiment, since the terrain regions of high alert are critical, the system will not allow the weather areas to completely cover said high terrain region alerts.

Although, the above invention is described in view of an avionic display, it will be understood in the art that it has other applications and that the invention is not limited to avionic displays. In particular, the present invention can be applied to any display screen where two or more sets of information need to be simultaneously displayed.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A display screen for displaying multiple sets of information, the display screen comprising:
   at least one region of a select color designated to convey a set of terrain information; and
   a plurality of adjustable areas designated to convey a set of weather information overlaying at least a portion of the set of terrain information, each adjustable area defined by an outline and a color encased in the outline.

2. The display screen of claim 1, wherein the plurality of adjustable areas are a plurality of circles, each circle being defined by a visibly distinct outline.

3. The display screen of claim 1, wherein the adjustable areas are adjusted by a user to reveal a desired amount of the first set of information.

4. The display screen of claim 1, wherein adjusting the size of the adjustable areas of the set of weather information is staggered in time based on classifications of the set of weather information.

5. The display screen of claim 1, wherein the plurality of adjustable areas are automatically adjusted in size in response to the detection of an event.

6. The display screen of claim 1, wherein each adjustable area of the plurality of adjustable areas is sized based upon classifications of the set of weather information the adjustable area represents.

7. The display screen of claim 1, further comprising:
   a third set of information underlying the set of terrain information and the set of weather information.

8. The display screen of claim 7, further comprising:
   the third set of information being an area location fill adapted to denote location, wherein the area fill provides a backdrop for the set of terrain information and the set of weather information.

9. An aviation display screen, the display screen comprising:
   an area location fill adapted to indicate non-threatening terrain at a location;
   terrain region alerts of select colors indicating threatening terrain; and
   a plurality of adjustably patterned weather areas overlaying the area location fill and the terrain region alerts, each patterned weather area having a visibly distinct defining border, wherein the size of each adjustable patterned area is adjustable to allow a desired visibility level of the area location fill and terrain regions alerts.

10. The display screen of claim 9, wherein the space between the patterned weather areas is adjustable.

11. The display screen of claim 9, wherein each patterned weather area is colored with a color that indicates the intensity of the weather in an associated location as indicated by the area location fill of the display screen.

12. The display screen of claim 9, wherein each patterned weather area is defined by a visibly distinct border.

13. The display screen of claim 9, wherein adjusting the size of each patterned weather area in the plurality of adjustably patterned areas is staggered in time based on the intensity of weather associated with each patterned weather area.

14. The display screen of claim 9, wherein the each patterned weather area is in the shape of one of a circle, square and triangle.

15. The display screen of claim 9, wherein the size of the plurality of patterned weather areas are automatically adjusted in response to the detection of an event.

16. A method of displaying different sets of information on the same display screen at the same time, the method comprising:
   displaying a set of terrain information with at least one color region that covers a portion of a display; and
   displaying a set of weather information with a plurality of adjustably sized areas of select colors overlying the set of terrain information, each adjustably sized area being defined by a visually distinct border such that the set of weather information is easily discernable from the set of terrain information when the terrain and weather information occupy the same region of the display even if the set of terrain information and the set of weather information are conveyed with the use of the same color palettes.

17. The method of claim 16, further comprising:
   adjusting the size of each adjustably sized area in the plurality of adjustably sized areas to display a desired amount of the terrain information.

18. The method of claim 16, further comprising:
   adjusting the color of each adjustably sized areas to indicate different types of the set of weather information.

19. The method of claim 16, further comprising:
   adjusting the density of the plurality of adjustably sized areas to indicate an intensity of the weather information.

20. The method of claim 16, further comprising:
   staggering the rate of adjusting the plurality of adjustable sized areas based on type of the weather information.

21. A method of displaying terrain and weather information on the same display screen simultaneously:
- displaying one or more terrain region alerts with one or more colors, wherein each color represents a level of hazard with an associated terrain; and
- overlaying at least a portion of the one or more terrain region alerts with a plurality of adjustable patterned weather areas, each weather area having a color indicative of the intensity of the weather it is associated with and a visibly distinct border.

22. The method of claim 21, futher comprising:
- displaying an area location fill underlaying the one or more terrain region alerts and the plurality of adjustable patterned weather areas.

23. The method of claim 21, futher comprising:
- adjusting the size of each patterned weather area of the plurality of patterned weather areas to display a desired amount of the one or more terrain regions.

24. The method of claim 21, further comprising:
- adjusting the density of the plurality of patterned weather areas in response to the detection of a hazard.

25. The method of claim 21, futher comprising:
- staggering the rate of adjusting the plurality of patterned weather areas based on the intensity of the weather each patterned weather area is associated with.

26. The method of claim 21, further comprising:
- drawing attention to at least one of the terrain region alerts and the pattered weather regions upon detection of an event.

27. The method of claim 21, further comprising:
- removing the color in each patterned weather area when the patterned weather areas are reduced in size by a select amount.

28. A computer-readable medium having computer-executable instructions for performing a method comprising:
- displaying one or more terrain region alerts over a given location with one or more regions of colors on a display screen, wherein different colors indicate different levels of concern of the terrain region alerts; and
- displaying a plurality of patterned weather areas overlaying at least a portion of the one or more terrain region alerts, wherein each patterned weather area includes a color indicative of the intensity of the weather at a location it represents and a border that is visibly distinct.

29. The computer-readable medium method of claim 28, further comprising:
- adjusting the size of each of the plurality of the patterned weather areas to display a select amount of terrain.

30. The computer-readable medium method of claim 29, further comprising:
- staggering in time the adjusting of each of the plurality of the patterned weather areas based on the intensity of weather each patterned weather area represents.

31. A display to display multiple sets of information simultaneously, the display comprising:
- a means for displaying a set of terrain information in regions of select colors, wherein each color represents a category of the set of terrain information;
- a means for displaying a set of weather information in the form of a plurality of patterned areas of select colors overlaying the set of terrain information, each patterned area being defined by a visibly distinct outline, wherein each color of the patterned area represents a category of the set of weather information: and
- a means for adjusting the size of the plurality of pattered areas to provide a desired viewable amount of the set of terrain information.

32. The display of claim 31, further comprising:
- a means for staggering in time the adjusting of each of the plurality of the patterned areas based on the category of the set of weather information.

33. The display of claim 31, further comprising:
- a means of alerting a user of a change to at least one of the terrain information and the weather information.

34. The display of claim 31, further comprising:
- a means of preventing a total coverage of the set of terrain information by the set of weather information when the terrain information includes information of a high level of concern.

* * * * *

UNITED STATES PATENT AND TRADEMARK OFFICE
CERTIFICATE OF CORRECTION

PATENT NO.         : 7,515,069 B2                                            Page 1 of 1
APPLICATION NO. : 11/115507
DATED              : April 27, 2005
INVENTOR(S)        : Michael C. Dorneich et al.

It is certified that error appears in the above-identified patent and that said Letters Patent is hereby corrected as shown below:

Column 8, line 24, "pattered" should be changed to --patterned--.

Signed and Sealed this

Ninth Day of June, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,515,069 B2 | Page 1 of 1 |
| APPLICATION NO. | : 11/115507 | |
| DATED | : April 7, 2009 | |
| INVENTOR(S) | : Michael C. Dorneich et al. | |

It is certified that error appears in the above-identified patent and that said Letters Patent is hereby corrected as shown below:

Column 8, line 24, "pattered" should be changed to --patterned--.

This certificate supersedes the Certificate of Correction issued June 9, 2009.

Signed and Sealed this

Seventh Day of July, 2009

JOHN DOLL
*Acting Director of the United States Patent and Trademark Office*